(12) United States Patent
Maeda et al.

(10) Patent No.: US 7,945,963 B2
(45) Date of Patent: May 17, 2011

(54) INFORMATION MEMORY APPARATUS USING PROBE

(75) Inventors: Takanori Maeda, Saitama (JP); Jun Suzuki, Saitama (JP); Masahiro Ishimori, Saitama (JP); Kenjiro Fujimoto, Saitama (JP); Atsushi Onoe, Saitama (JP)

(73) Assignee: Pioneer Corporation, Tokyo (JP)

( * ) Notice: Subject to any disclaimer, the term of this patent is extended or adjusted under 35 U.S.C. 154(b) by 395 days.

(21) Appl. No.: 12/295,022

(22) PCT Filed: Mar. 30, 2007

(86) PCT No.: PCT/JP2007/057144
§ 371 (c)(1),
(2), (4) Date: Dec. 5, 2008

(87) PCT Pub. No.: WO2007/114353
PCT Pub. Date: Oct. 11, 2007

(65) Prior Publication Data
US 2009/0178167 A1  Jul. 9, 2009

(30) Foreign Application Priority Data

Mar. 30, 2006  (JP) .................................. 2006-095473

(51) Int. Cl.
*G11B 5/33* (2006.01)
(52) U.S. Cl. ................ 850/13; 360/125.31; 369/126
(58) Field of Classification Search .................... 850/13, 850/56; 360/125.31, 125.14, 125.3; 369/126, 369/100
See application file for complete search history.

(56) References Cited

U.S. PATENT DOCUMENTS

| 5,412,641 | A | 5/1995 | Shinjo et al. |
| 6,411,589 | B1 | 6/2002 | Hoen et al. |
| 7,869,162 | B2 * | 1/2011 | Lu et al. .................. 360/125.31 |
| 2002/0047318 | A1 | 4/2002 | Choi et al. |
| 2005/0243659 | A1 | 11/2005 | Rust et al. |
| 2007/0274192 | A1 | 11/2007 | Gidon et al. |

FOREIGN PATENT DOCUMENTS

| EP | 0 978 832 A | 2/2000 |
| EP | 1 168 334 A | 1/2002 |
| JP | 2005-63511 | 3/2005 |
| JP | 2006-18880 | 1/2006 |
| WO | WO 2005/122161 A | 12/2005 |

OTHER PUBLICATIONS

International Search Report for PCT/JP2007/057144 mailed Jul. 3, 2007.

* cited by examiner

*Primary Examiner* — Kiet T Nguyen
(74) *Attorney, Agent, or Firm* — Nixon & Vanderhye P.C.

(57) ABSTRACT

A first thermal buffer layer and a second thermal buffer layer are arranged between a recording medium and an actuator structure. The heat conductivity of the first thermal buffer layer is set low and the heat conductivity of the second thermal buffer layer is set high. Most of the heat generated from a coil wiring of the actuator structure is blocked by the first thermal buffer layer, and heat leaked from the first thermal buffer layer is diffused by the second thermal buffer layer. Temperature distribution on the recording medium is made uniform, and thus, a configuration wherein the recording medium and the actuator structure are placed one over another can be provided, information reading accuracy or information recording stability can be improved and the sizes of an information storage device can be reduced.

7 Claims, 5 Drawing Sheets

INFORMATION MEMORY APPARATUS USING PROBE

TECHNICAL FIELD

This application is the U.S. national phase of International Application No. PCT/JP2007/057144 filed 30 Mar. 2007 which designated the U.S. and claims priority to Japanese Patent Application No. 2006-095473 filed 30 Mar. 2006, the entire contents of each of which are hereby incorporated by reference.

BACKGROUND ART

As a small-sized information memory apparatus which can record information highly densely, a scanning probe memory apparatus is listed.

The scanning probe memory apparatus has various types: using a tunnel effect, using an atomic force, using a magnetic force, using an electrostatic force, using a non-linear dielectric constant, and using heat deformation of a recording medium.

The scanning probe memory apparatus is normally provided with: a probe having a tip with a radius of about several tens nanometers to several micrometers; and a plate-like (or flat) recording medium having a recording surface formed on its surface. The scanning probe memory apparatus brings the tip of the probe closer to or into contact with the recording surface of the recording medium, to thereby perform information recording or reading on the recording medium.

Moreover, the scanning probe memory apparatus displaces the probe or the recording medium in a parallel direction to the recording surface, to thereby change the positional relation between the probe and the recording medium. By this, it is possible to scan the recording surface of the recording medium using the probe, so that a large amount of information can be arranged on the recording surface highly densely. Alternatively, the large amount of information arranged on the recording surface can be read continuously or randomly. For such displacement of the probe or the recording medium, an electromagnetically-driven or electrostatically-driven actuator using e.g. a MEMS (Micro Electro Mechanical System) technology is used.

Moreover, most scanning probe memory apparatuses adopt a multi-probe method. That is, most scanning probe memory apparatuses are provided with: a two-dimensional probe head in which several tens, several hundreds, or several thousands of probes are arranged in a matrix, for example. By using such a probe head, it is possible to quickly record the large amount of information into the recording medium, or it is possible to quickly read the large amount of information from the recording medium.

DISCLOSURE OF INVENTION

Subject to be Solved by the Invention

By the way, in order to realize the small-sized scanning probe memory, it is necessary to consider where an actuator for displacing the probe or the recording medium with respect to the recording surface is to be disposed in the apparatus.

As one idea, it is considered to arrange the recording medium and the actuator in the parallel direction to the recording surface. That is, the recording medium and the actuator are arranged in the parallel direction to the recording surface, and they are combined to each other by coupling members extending in the parallel direction to the recording surface. Then, the drive of the actuator allows the coupling members to be pulled or pushed back in the parallel direction to the recording surface, to thereby displace the recording medium in the parallel direction to the recording surface. On the other hand, the probes are disposed above the recording medium and are fixed to a housing or the like not to move even if the recording medium is displaced. By this, it is possible to displace the recording medium with respect to the probes, to thereby scan the recording medium by the probes.

However, according to such construction in which the recording medium and the actuator are arranged in the parallel direction to the recording surface, a projected area of the probe memory apparatus increases in the case where a parallel surface to the recording surface is regarded as a projected surface.

On the other hand, as another idea, such construction is considered that the recording medium and the actuator are arranged in piles in a perpendicular direction to the recording surface. For example, the recording medium is laminated on a plate-like structure incorporating the actuator therein. Then, it is constructed such that the drive of the actuator allows the plate-like structure and the recording medium to be displaced in a unified manner in the parallel direction to the recording surface. On the other hand, the probes are disposed above the recording medium and fixed to the housing or the like not to move even if the recording medium is displaced. By this, it is possible to displace the recording medium with respect to the probes, to thereby scan the recording medium by the probes.

However, according to such construction in which the recording medium and the actuator are arranged in piles in the perpendicular direction to the recording surface, the actuator and the recording medium are disposed closely to each other. Thus, a heat emitted from the actuator in the driving tends to be conducted to the recording medium. Moreover, a heat source in the actuator is mainly a coil in the case of the electromagnetically-driven actuator, and it is mainly a comb tooth electrode in the case of the electrostatically-driven actuator. Thus, the heat is locally generated. As a result, a temperature distribution of the recording medium is uneven, and the recording medium is possibly unevenly thermally-expanded.

If the recording medium is unevenly thermally-expanded, the smoothness of the recording surface is impaired, or the arrangement of the information recorded on the recording surface is possibly distorted. As a result, a jitter in an information reading signal possibly increases, and the accuracy of the information reading possibly reduces.

Moreover, the scanning probe memory apparatus using the heat deformation of the recording medium heats the tips of the probes, brings the heated tips into contact with the recording surface of the recording medium, and thermally-deforms the recording surface locally, to thereby form pits on the recording surface. In the scanning probe memory apparatus having such an information recording principle, if the temperature distribution of the recording medium is uneven due to the conduction of the heat emitted from the actuator, the pit shape of the recording medium becomes variable, so that the information recording possibly becomes unstable.

In view of the aforementioned problems, it is therefore a first object of the present invention to provide an information memory apparatus which can improve the accuracy of the information reading or the stability of the information recording and which can reduce the size.

It is a second object of the present invention to provide an information memory apparatus which can inhibit the heat emitted from the actuator from being conducted to the recording medium, and which can inhibit the uneven temperature distribution of the recording medium, even if the recording medium and the actuator are arranged in piles in the perpendicular direction to the recording surface.

Means for Solving the Subject

The above object of the present invention can be achieved by an information memory apparatus provided with: a plate-like recording medium having a recording surface; a probe which is disposed above the recording medium if a perpendicular direction to the recording medium is set as a vertical direction, and which records or reads information with respect to the recording medium; an actuator structure which is disposed under the recording medium and which displaces the recording medium in a parallel direction to the recording surface; and a first heat buffer layer which is disposed between the recording medium and the actuator structure and which inhibits conduction of a heat from the actuator structure to the recording medium.

These effects and other advantages of the present invention will become more apparent from the embodiments explained below.

DESCRIPTION OF REFERENCE CODES 1, 50 scanning probe memory apparatus
21, 61 recording medium
21C, 61C recording surface
22, 62 actuator structure
23, 63 first heat buffer layer
24, 64 second heat buffer layer
25, 65 heat release layer
31 coil wiring
33, 73 probe
71 comb tooth electrode Best Mode for Carrying Out the Invention Hereinafter, the best mode for carrying out the invention will be explained in each embodiment in order, with reference to the drawings.

First Embodiment

Figure 1:
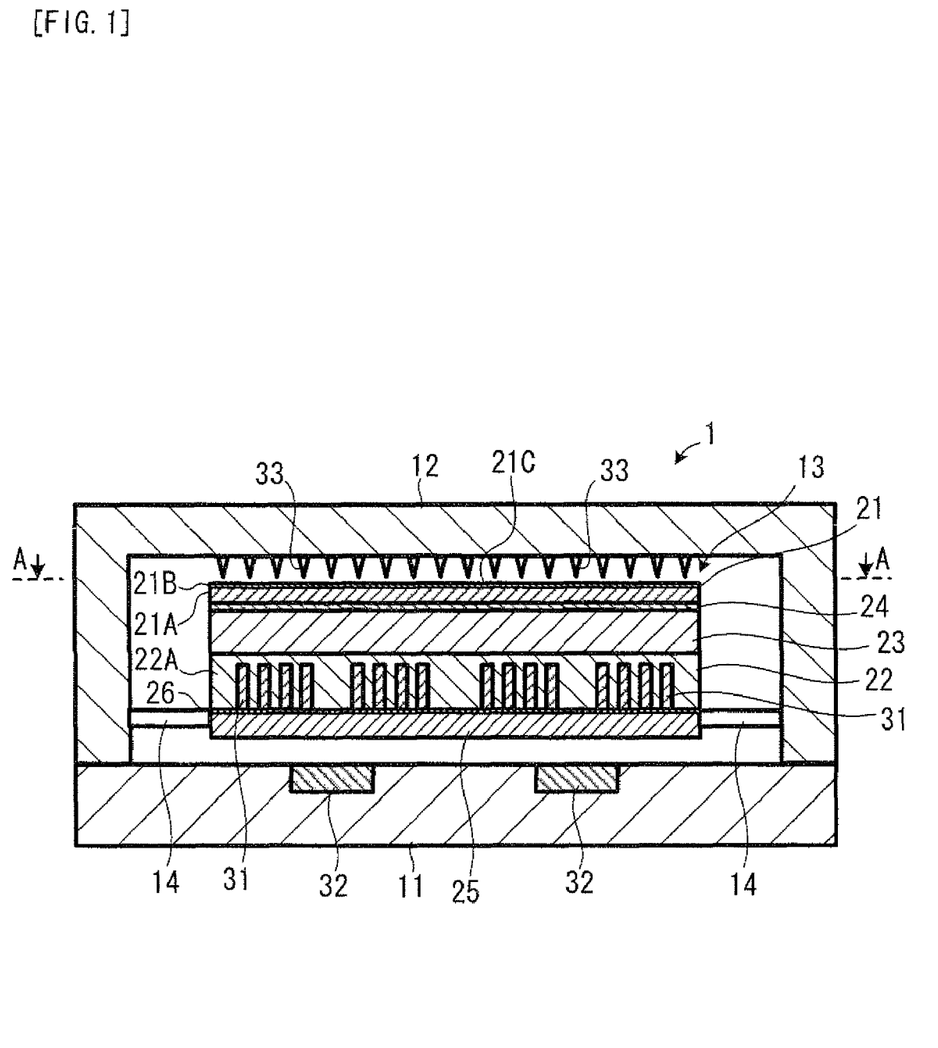
FIG. 1 is a longitudinal sectional view showing a probe memory apparatus in a first embodiment of the information memory apparatus of the present invention.
Figure 2:
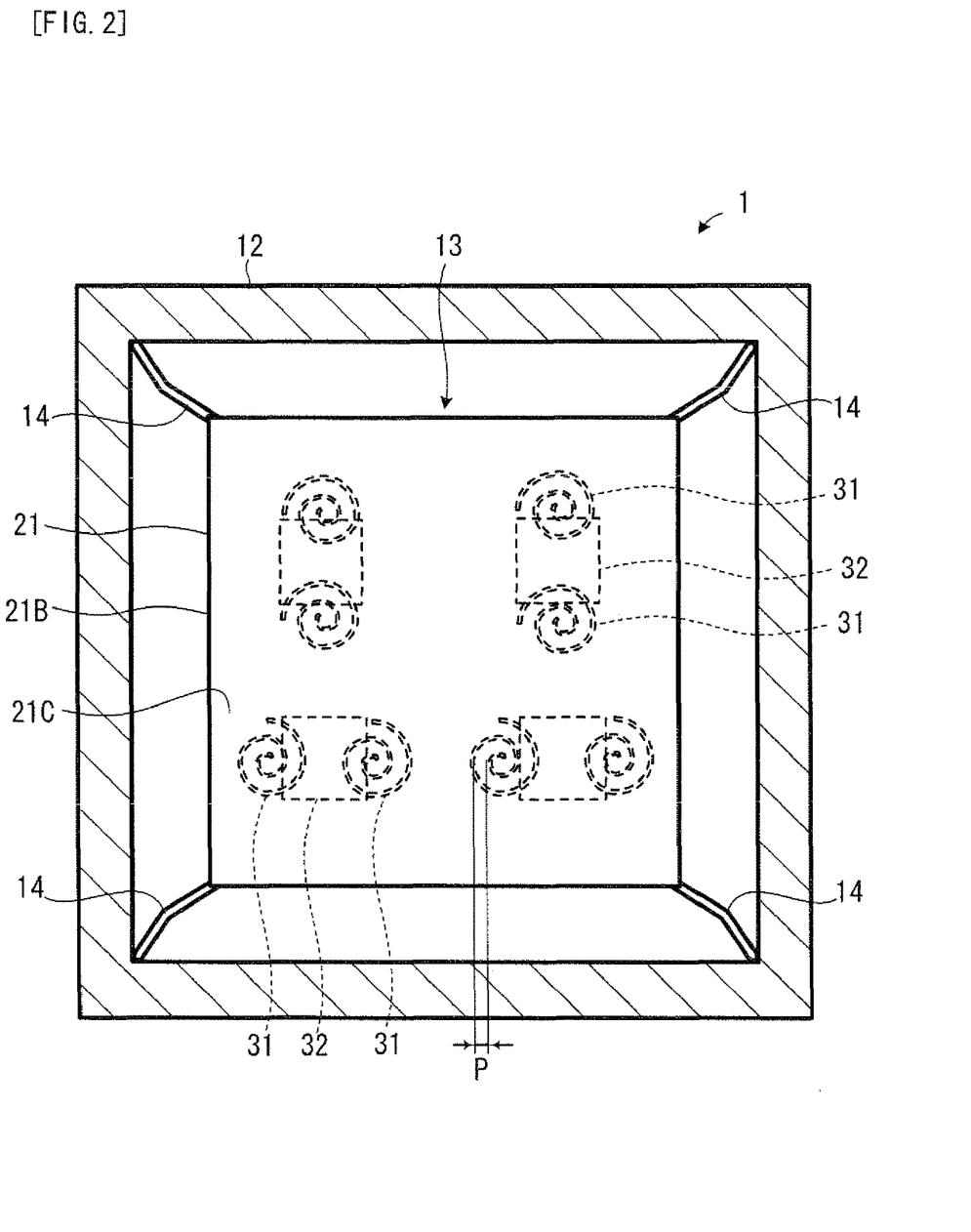
FIG. 2 is a cross sectional view showing the probe memory apparatus in FIG. 1, viewed from an arrow A-A direction in FIG. 1.

FIG. 1 is a longitudinal sectional view showing a probe memory apparatus in a first embodiment of the information memory apparatus of the present invention. FIG. 2 is a cross sectional view showing a probe memory apparatus 1 in FIG. 1, viewed from an arrow A-A direction in FIG. 1.

The probe memory apparatus 1 in FIG. 1 is a small-sized apparatus, for example, which is several millimeters to several centimeters in length and in width (length in a horizontal direction and a vertical direction in FIG. 1) and which is several millimeters in thickness (length in a vertical direction in FIG. 2), in external dimensions.

The probe memory apparatus 1 can record information onto a recording surface 21C of a recording medium 21 highly densely, using probes 33, and has a huge memory capacity regardless of its small size. For example, the memory capacity is several tens to several hundreds gigabytes, and can also exceed a terabyte.

The probe memory apparatus 1 locally thermally-deforms the recording surface 21C of the recording medium 21, to thereby form pits on the recording surface 21C and record the information. That is, the probe memory apparatus 1 applies an electric current to the tips of the probes 33, generates a heat on the tips of the probes 33, and brings the heated tips of the probes 33 into contact with the recording surface 21C. By this, the recording surface 21 is thermally-deformed in a portion that the tips of the probes 33 are in contact with, and the pits are formed on the recording surface 21C.

Moreover, the probe memory apparatus 1 is provided with an electromagnetically-driven actuator, and the drive of the actuators allows the recording medium 21 to be displaced in a parallel direction to the recording surface 21C. On the other hand, the probes 33 are fixed on a housing 12. By this, it is possible to change the relative position between the probes 33 and the recording medium 21, to thereby scan the recording surface 21C by using the probes 33.

Moreover, the probe memory apparatus 1 is provided with a two-dimensional probe array in which several tens, or several hundreds, or several thousands of probes 33 are arranged in a matrix, for example. By this, it is possible to quickly record a large amount of information onto the recording surface 21C, or to quickly read a large amount of information from the recording surface 21C.

As shown in FIG. 1, the probe memory apparatus 1 has a plate-like housing 11 disposed in the lower portion and the cup-shaped housing 12 disposed in the upper portion. There is a space formed between the housing 11 and the housing 12.

Moreover, the probe memory apparatus 1 is provided with a moving device 13. The moving device 13 is disposed in the space formed between the housing 11 and the housing 12. There is also a vacant space or gap between the lower surface of the moving device 13 (lower surface of a heat release layer 25) and the upper surface of the housing 11. Moreover, there is also a vacant space or gap between the upper surface of the moving device 13 (recording surface 21C) and the lower surface of the housing 12. Moreover each side surface of the moving device 13 is away from each inner side surface of the housing 12 facing the side surface of the moving device 13.

The moving device 13 is supported by the housing 12 using four support devices 14, as shown in FIG. 2. The support device 14 can be deformed in the parallel direction to the recording surface 21C, to thereby function as a spring. The deformation of the support device 14 allows the moving device 13 to be displaced in the parallel direction to the recording surface 21C, in the space formed between the housing 11 and the housing 12.

The moving device 13 is provided with: the recording medium 21; an actuator structure 22; a first heat buffer layer 23; a second heat buffer layer 24; the heat release layer 25; and an insulating layer 26. The constituent elements are laminated in the order of the heat release layer 25, the insulating layer 26, the actuator structure 22, the first heat buffer layer 23, the second heat buffer layer 24, and the recording medium 21, from the bottom to the top. The constituent elements adjacent to each other are firmly combined. By this, the constituent elements can be displaced in a uniformed manner in the parallel direction to the recording surface 21C.

The recording medium 21 is a plate-like object. The recording medium 21 is provided with: a substrate 21A; and a recording layer 21B.

The substrate 21A is formed of silicon, for example. The substrate 21A is about 10 μm in thickness, for example. Moreover, the thermal conductivity of the substrate 21A is about 168 W/(mK), for example.

The recording layer 21B is a thin film laminated on the substrate 21A. The recoding layer 21B is formed of a polymer resin, for example. Moreover, the recording layer 21B is 1 μm or less in thickness, for example. Moreover, the upper surface of the recording layer 21B is the recording surface 21C. By bringing the tips of the heated probes 33 into contact with the recording surface 21C, the recording layer 21B is thermally-deformed, to thereby form the pits on the recording surface 21C.

Incidentally, the thickness of the recording layer 21B is sufficiently thinner than that of the substrate 21A, so that the thermal conductivity of the recoding medium 21 as a whole is substantially equal to that of the substrate 21A.

The actuator structure 22 constitutes one portion of the electrically-driven actuator for displacing the recording medium 21 (moving device 13) in the parallel direction to the recording surface 21C. The actuator structure 22 is disposed on the lower side of the recording medium 21. The actuator structure 22 is provided with: a substrate 22A; and coil wirings 31.

The substrate 22A is formed of SiO$_2$, for example.

The coil wirings 31 are formed of copper, for example. The coil wirings 31 are embedded within the substrate 22A, as shown in FIG. 1. Moreover, the coil wirings 31 are formed spirally, as shown in FIG. 2. A pitch P of the coil wiring 31 is about 500 μm, for example.

On the other hand, the housing 11 is provided with a permanent magnet 32. The permanent magnet 32 and the actuator structure 22 constitute the electromagnetically-driven actuator. By applying an electric current to the coil wirings 31, it is possible to create a force to displace the recording medium 21 (moving device 13) in the parallel direction to the recording surface 21C.

The first heat buffer layer 23 inhibits the heat conduction from the actuator structure 22 to the recording medium 21. The first heat buffer layer 23 is disposed between the recording medium 21 and the actuator 22, as shown in FIG. 1. The first heat buffer layer 23 is formed of a polyimide resin or ultraviolet-curable resin, for example. Moreover, the first heat buffer layer 23 is desirably about 20 μm in thickness; however, it may be thicker than 20 μm. Moreover, the thermal conductivity of the first heat buffer layer 23 is less than that of the recording medium 21. Specifically, the thermal conductivity of the first heat buffer layer 23 is about 0.29 W/(mK), for example.

The second heat buffer layer 24 diffuses a heat leaked from the first heat buffer layer 23. The second heat buffer layer 24 is disposed between the recording medium 21 and the first heat buffer layer 23. The second heat buffer layer 24 is formed of platinum or copper, for example. Moreover, the second heat buffer layer 24 is desirably about 1 μm or less in thickness. Moreover, the thermal conductivity of the second heat buffer layer 24 is greater than that of the first heat buffer layer 23. Specifically, the thermal conductivity of the second heat buffer layer 24 is about 72 W/(mK), for example.

The heat release layer 25 releases the heat emitted from the actuator structure 22, to the lower side of the moving device 13. The heat release layer 25 is disposed on the lower side of the actuator structure 22. The heat release layer 25 is formed of a material whose thermal resistance is small, for example, copper. Moreover, the heat release layer 25 is about 10□m in thickness, for example. Moreover, between the heat release layer 25 and the actuator structure 22, an insulating layer 26 is provided to electrically insulate between the coil wirings 31 and the heat release layer 25. Moreover, each support device 14 is connected to the heat release layer 25.

The probes 33 are disposed above the recording medium 21 and perform the information recording or reading with respect to the recording surface 21. The tip diameter of each probe 33 is about 50 nm, for example.

Figure 3:
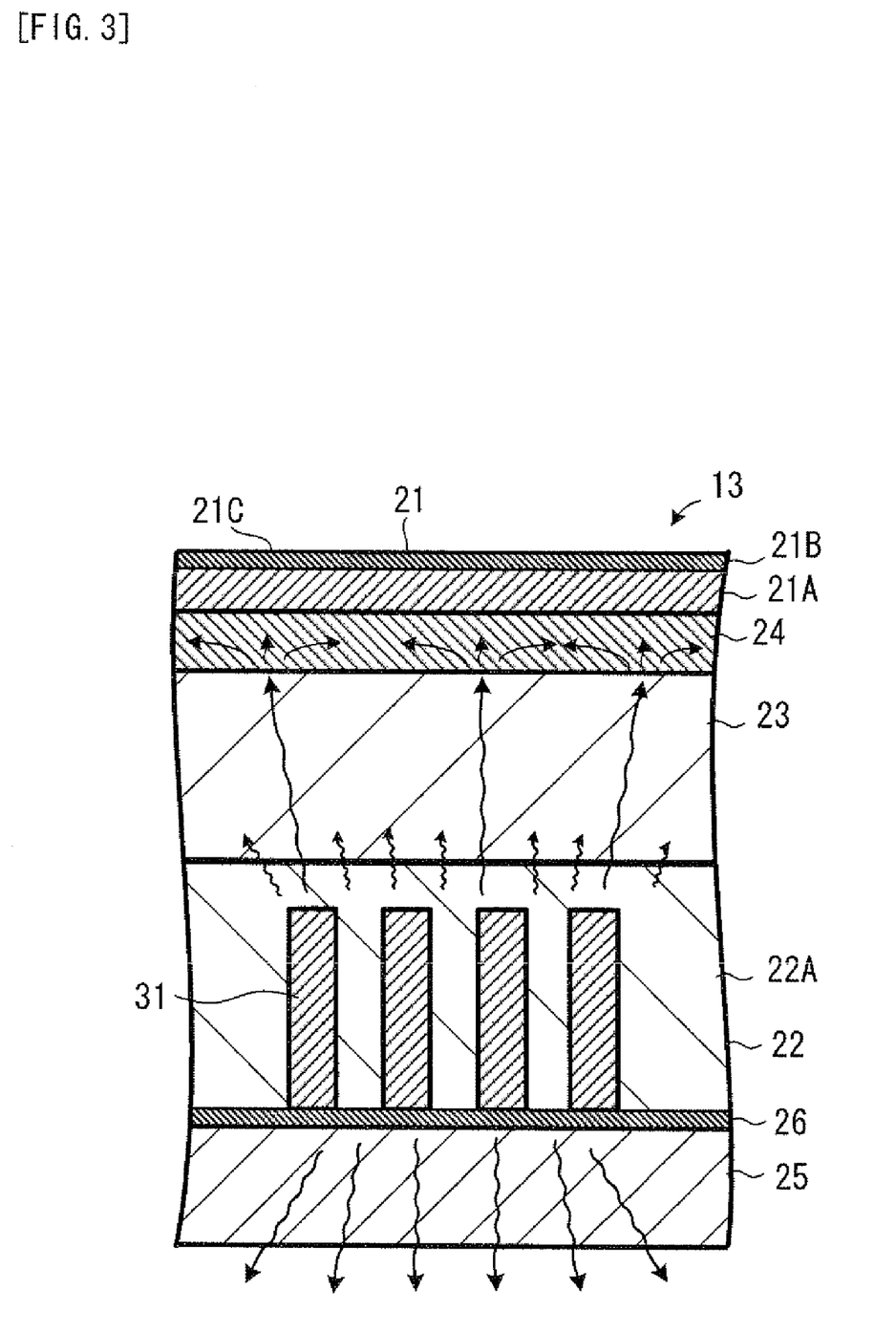
FIG. 3 is a longitudinal sectional view enlarging and showing one portion of a moving device in the probe memory apparatus in FIG. 1.

FIG. 3 enlarges and shows one portion of a cross section of the moving device 13. From now, using FIG. 3, an explanation will be given on a buffer action of the first heat buffer layer 23 and the second heat buffer layer 24 and a heat release action of the heat release layer 25.

The actuator is driven to displace the moving device 13 in the parallel direction to the recording surface 21C. When the actuator is driven, an electric current is applied to the coil wirings 31. By applying the electric current to the coil wirings 31, the coil wirings 31 generate a heat. The pitch of the coil wiring 31 is, for example, 500 μm, so that the heat is locally generated.

One portion of the heat emitted from the coil wirings 31 is conducted within the substrate 22A of the actuator structure 22, and goes toward the upper side of the actuator structure 22.

The first heat buffer layer 23 is disposed on the actuator structure 22. The first heat buffer layer 23 has the small thermal conductivity, as described above. Therefore, a most part of the heat going toward the upper side of the actuator structure 22 is blocked by the first heat buffer layer 23.

Although the most part of the heat going toward the upper side of the actuator structure 22 is blocked by the first heat buffer layer 23, one portion of the heat is conducted through the first heat buffer layer 23 and leaked to the upper side of the first heat buffer layer 23.

The second heat buffer layer 24 is disposed on the first heat buffer layer 23. The second heat buffer layer 24 has the large thermal conductivity, as described above. Therefore, the heat leaked from the first heat buffer layer 23 diffuses in the second heat buffer layer 24. That is, even if one portion of the heat emitted from the coil wirings 23 is locally conducted within the first heat buffer layer 23, the local heat spreads in a wide range in substantially the parallel direction to the recording surface 21C in the second heat buffer layer 24.

In some cases, the heat diffusing in the second heat buffer layer 24 is conducted to the recording medium 21. If the heat diffusing in the second heat buffer layer 24 is conducted to the recording medium 21, the temperature of the recording medium 21 increases. However, the most part of the heat emitted from the coil wirings 31 is blocked by the first heat buffer layer 23, so that the extent of the increase in the temperature of the recording medium 21 is small. Moreover, the heat leaked from the first heat buffer layer 23 is diffused by the second heat buffer layer 24, so that the temperature distribution of the recording medium 21 is substantially even or uniform.

On the other hand, one portion of the heat emitted from the coil wirings 31 is conducted toward the lower side of the actuator structure 22.

The heat release layer 25 is disposed under the actuator structure 22. The heat release layer 25 has the small heat resistance, as described above. By this, the heat conducted toward the lower side of the actuator structure 22 is released through the heat release layer 25 toward the lower side of the moving device 13. Moreover, each support device 14 is connected to the heat release layer 25. By this, the heat conducted to the heat release layer 25 is released toward the housing 12 side through each support device 14. As a result, the amount of the heat emitted from the coil wirings 31 and conducted toward the recording medium 21 reduces, and thus the extent of the increase in the temperature of the recording medium 21 further reduces.

As explained above, the probe memory apparatus 1 has the first heat buffer layer 23 which is disposed between the actuator structure 22 and the recording medium 21. By this, it is possible to inhibit the heat locally emitted in the actuator structure 22 from being conducted from the actuator structure 22 to the recording medium 21.

Therefore, even if the actuator structure 22 and the recording medium 21 are arranged in piles in the perpendicular direction to the recording surface 21C, it is possible to inhibit the uneven temperature distribution of the recording medium in driving the actuator. That is, even if the actuator structure 22 and the recording medium 21 are brought extremely close to each other by arranging actuator structure 22 and the recording medium 21 in piles, it is possible to inhibit the uneven temperature distribution of the recording medium 21.

By this, it is possible to reduce a projected area of the probe memory apparatus 1 in the case where a parallel surface to the recording surface 21C is regarded as a projected surface, and it is possible to reduce the size of the probe memory apparatus 1.

At the same time, it is possible to inhibit the uneven thermal expansion of the recording medium 21, to reduce a jitter in an information reading signal, and to improve the accuracy of the information reading.

Moreover, it is possible to inhibit the uneven shape of the pits formed on the recording surface 21C, which is caused by the uneven temperature distribution of the recording medium 21, so that it is possible to improve the stability of the information recording.

Moreover, these effects are further increased by making the thermal conductivity of the first heat buffer layer 23 less than that of the second heat buffer layer 24.

Moreover, by reducing the thermal conductivity of the first heat buffer layer 23, it is possible to thin the first heat buffer layer 23, to thereby thin the probe memory apparatus 1.

Moreover, the probe memory apparatus 1 has the second heat buffer layer 24, which is disposed between the first heat buffer layer 23 and the recording medium 21. Moreover, the thermal conductivity of the second heat buffer layer 24 is greater than that of the first heat buffer layer 23. By this, it is possible to diffuse the heat which is leaked from the first heat buffer layer 23 and which goes toward the recording medium 21. Therefore, it is possible to inhibit the uneven temperature distribution of the recording medium 21. The effect of inhibiting the uneven temperature distribution of the recording medium 21 is greater in the case where the first heat buffer layer 23 and the second heat buffer layer 24 are provided, than in the case where only the first heat buffer layer 23 is provided.

Moreover, the probe memory apparatus 1 is provided with the heat release layer 25, which is disposed under the actuator structure 22 and which releases the heat emitted from the actuator structure 22. By this, it is possible to release the heat emitted from the actuator structure 22, toward the lower side of the actuator structure 22. Therefore, it is possible to reduce the amount of the heat, which is emitted from the actuator structure 22 and which is conducted toward the recording medium 21.

Second Embodiment

Figure 4:
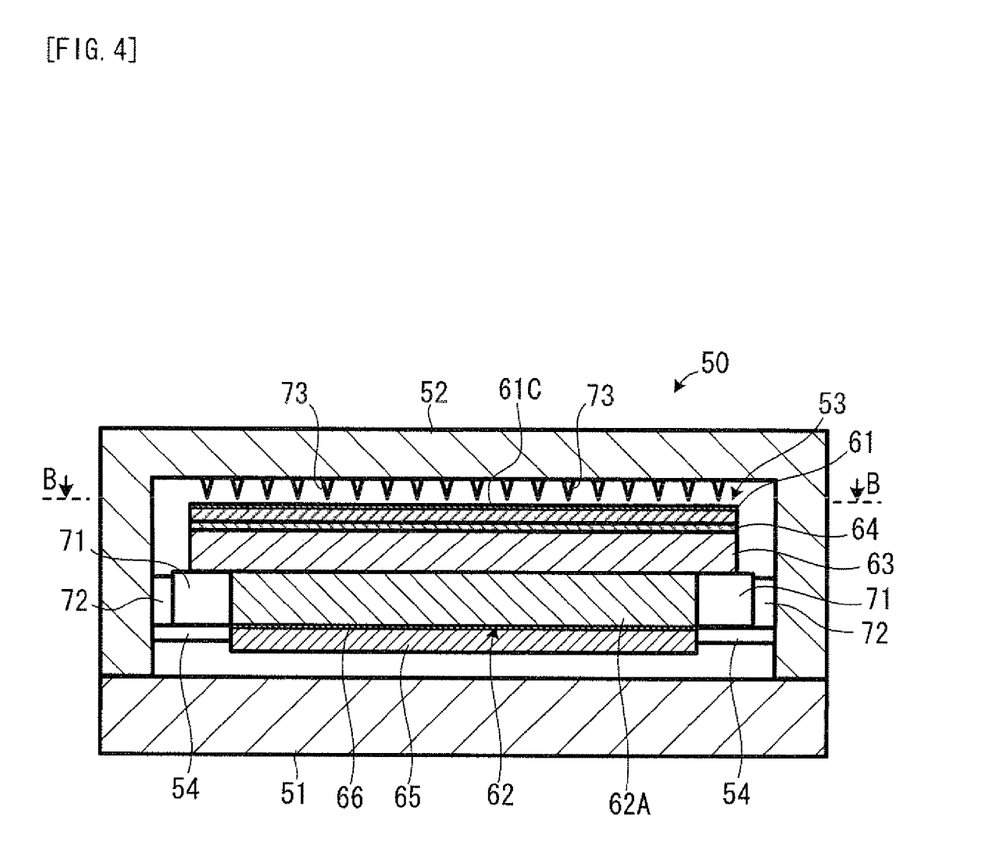
FIG. 4 is a longitudinal sectional view showing a probe memory apparatus in a second embodiment of the information memory apparatus of the present invention.
Figure 5:
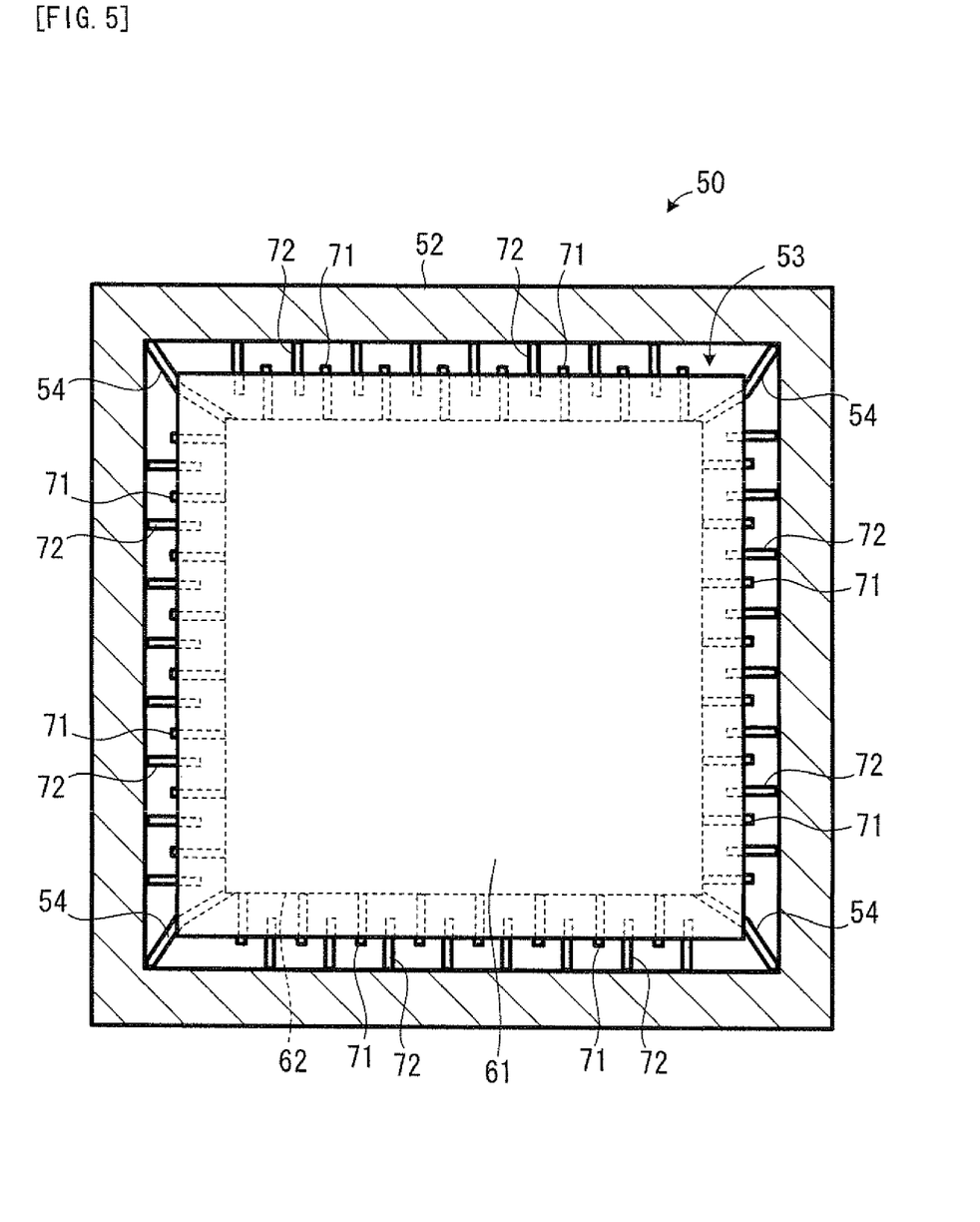
FIG. 5 is a cross sectional view showing the probe memory apparatus in FIG. 4, viewed from an arrow B-B direction in FIG. 4.

FIG. 4 is a longitudinal sectional view showing a probe memory apparatus in a second embodiment of the information memory apparatus of the present invention. FIG. 5 is a cross sectional view showing a probe memory apparatus 50 in FIG. 4, viewed from an arrow B-B direction in FIG. 4.

The probe memory apparatus 50 in FIG. 4, as in the probe memory apparatus 1 in FIG. 1, has a huge memory capacity regardless of its small size. Moreover, the probe memory apparatus 50 adopts the method in which the tips of probes 73 heated are brought into contact with a recording surface 61C formed of a polymer resin, to thereby form the pits and record the information, as in the probe memory apparatus 1.

On the other hand, as opposed to the probe memory apparatus 1, the probe memory apparatus 50 provided with an electrostatically-driven actuator.

As shown in FIG. 4, in a space between a housing 51 and a housing 52 of the probe memory apparatus 50, a moving device 53 is disposed. The moving device 53 is supported by support device 54 in such a condition that the moving device 53 can be displaced in a parallel direction to the recording surface 61C.

The moving device 63 is provide with: a recording medium 61; an actuator structure 62; a first heat buffer layer 63; a second heat buffer layer 64; a heat release layer 65; and an insulating layer 66. The constituent elements are laminated in the order of the heat release layer 65, the insulating layer 66, the actuator structure 62, the first heat buffer layer 63, the second heat buffer layer 64, and the recording medium 61, from the bottom to the top. By this, the constituent elements can be displaced in a uniformed manner in the parallel direction to the recording surface 61C.

The recording medium 71, the first heat buffer layer 63, the second heat buffer layer 64, the heat release layer 65, and the insulating layer 66 are substantially the same as the recording medium 21, the first heat buffer layer 23, the second heat buffer layer 24, the heat release layer 25, and the insulating layer 26, respectively.

The actuator structure 62 constitutes one portion of the electrostatically-driven actuator for displacing the recording medium 61 (moving device 53) in the parallel direction to the recording surface 61C. The actuator structure 62 is disposed on the lower side of the recording medium 61. The actuator structure 62 is provided with: a substrate 62A; and comb tooth electrodes 71.

The comb tooth electrodes 71 are formed in the surrounding of the substrate 62A. On the other hand, comb tooth electrodes 72 are formed in the inner side surface of the housing 12. The comb tooth electrodes 71 and the comb tooth electrodes 72 are engaged through a vacant space. By forming an electric field between the comb tooth electrodes 71 and 72, it is possible to create a force to displace the recording medium 61 (moving device 53) in the parallel direction to the recording surface 61C.

Even the probe memory apparatus 50 having such a structure can also obtain the same effects as those of the probe memory apparatus 1.

That is, even if the comb tooth electrodes 71 and the recording medium 61 are brought extremely close to each other by arranging the comb tooth electrodes 71 and the recording medium 61 in piles, it is possible to inhibit the uneven temperature distribution of the recording medium 61. Therefore, it is possible to reduce the size of the probe memory apparatus 50, and it is also possible to improve the accuracy of the information reading or the stability of the information recording.

Incidentally, in the probe memory apparatus 1 in FIG. 1, the area of the surface of the first heat buffer layer 23 in the parallel direction to the recording surface 21C is substantially equal to the area of the upper surface of the actuator structure 22 or the area of the lower surface of the recording medium 21. That is, the first heat buffer layer 23 is laminated fully on the upper surface of the actuator structure 22. Moreover, the second heat buffer layer 24 is also laminated fully on the upper surface of the first heat buffer layer 23. By this, it is possible to facilitate the manufacturing the recording medium 21, the first heat buffer layer 23, the second heat buffer layer 24, and the actuator structure 22.

For example, a multilayer plate-like material is prepared which has a large area in which a material of the substrate 22A of the actuator structure 22, a material of the first heat buffer layer 23, a material of the second heat buffer layer 24, and a material of the recording medium 21 are laminated in advance. Then, from the multilayer plate-like material, a block is cut out which has the same shape as the upper surface shape of the recording medium 21. By performing only this simple process, it is possible to produce a structure formed of the recording medium 21, the first heat buffer layer 23, the second heat buffer layer 24, and the substrate 22A of the actuator structure 22.

Incidentally, the first heat buffer layer may be disposed only in an area corresponding to an area in which the coil wirings 31 of the actuator structure 22 are formed.

In the same manner, even in the probe memory apparatus 50 in FIG. 4, by forming the first heat buffer layer 63 and the second heat buffer layer 64 fully in accordance with the lower surface of the recording medium 61, it is possible to produce a structure formed of the recording medium 61, the first heat buffer layer 63, the second heat buffer layer 64, and the substrate 62A of the actuator structure 62. Incidentally, the first heat buffer layer may be disposed only in an area corresponding to an area in which the comb tooth electrodes 71 are formed.

The material and thickness of the first heat buffer layers 23 and 63 are not limited to those in the aforementioned specific example. Incidentally, the material and thickness of the first heat buffer layers 23 and 63 are desirably determined in view of the extent of a heat energy emitted from the coil wirings 31 or the comb tooth electrodes 71, the extent of a heat inhibition effect of the first heat buffer layers 23 and 63, the thermal conductivity of the recording mediums 21 and 61, the extent of an influence of the uneven temperature distribution of the recording mediums 21 and 61 on the information recording and reading, the request to thin the probe memory apparatuses 1 and 50, and the like. The same is true for the material and thickness of the second heat buffer layers 24 and 64.

Moreover, if a material whose thermal resistance value is small is used for the first heat buffer layers 23 and 63, the first heat buffer layers 23 and 63 are thickened. For example, if SiC with a thermal resistance value of 3.0 W/cmK is used for the first heat buffer layers 23 and 63, the thickness of the first heat buffer layers 23 and 63 are set to 90 µm or more. Even by such construction, it is possible to ease the uneven temperature distribution of the recording mediums 21 and 61.

Moreover, in the probe memory apparatuses 1 and 50, such an case has been given that the first heat buffer layers 23 and 63 whose thermal conductivity is small are disposed on the actuator structure 22 and the second heat buffer layers 24 and 64 whose thermal conductivity is large are disposed on the first heat buffer layers 23 and 63. The present invention, however, is not limited to this. A heat buffer layer whose thermal conductivity is large may be disposed on the actuator structure 22 and a heat buffer layer whose thermal conductivity is small may be disposed on the heat buffer layer whose thermal conductivity is large. Firstly, a heat is diffused near a heat source, and then the conduction of the diffused heat is inhibited. By this, it is possible to uniform the temperature distribution while inhibiting the increase in the temperature of the recording medium.

Alternatively, such a three-layer structure may be formed that a heat buffer layer whose thermal conductivity is large is disposed on the actuator structure 22, another heat buffer layer whose thermal conductivity is small is disposed on the heat buffer layer whose thermal conductivity is large, and another heat buffer layer whose thermal conductivity is large is disposed on the another heat buffer layer. Firstly, a heat is diffused near a heat source, then the conduction of the diffused heat is inhibited, and then the heat is further diffused under the recording medium. Even in such a structure, it is possible to uniform the temperature distribution while inhibiting the increase in the temperature of the recording medium.

Moreover, the first heat buffer layer may be formed of an adhesive material for adhering the recording medium and the actuator structure, By this, it is possible to form an adhesive layer and the heat buffer layer as a single layer. This structure contributes to the thinned probe memory apparatus.

Moreover, in the aforementioned explanation, the scanning probe memory apparatus of a type in which the recording surface is thermally-deformed to record the information is given as an example; however, the present invention is not limited to this. The present invention can be also applied to a scanning probe memory apparatus of a SNDM (Scanning Nonlinear Dielectric Microscopy) type. In this case, a recording medium with a recording layer formed of a ferroelectric material is used, and an electrode is disposed under the recording layer.

Moreover, in this case, the second heat buffer layer disposed on the first heat buffer layer may be formed of a material of the electrode of the recording medium. By this, it is possible to form the electrode and the heat buffer layer as a single layer. This structure contributes to the thinned probe memory apparatus.

Moreover, in the present invention, various changes may be made, if desired, without departing from the essence or spirit of the invention which can be read from the claims and the entire specification. An information memory apparatus, which involves such changes, is also intended to be within the technical scope of the present invention.

INDUSTRIAL APPLICABILITY

The information memory apparatus using the probe according to the present invention can be applied to an information memory apparatus for recording or reading information with respect to a recording medium, using a probe, such as a scanning probe memory apparatus.

The invention claimed is:
1. An information memory apparatus comprising:
a plate-like recording medium having a recording surface;
a probe which is disposed above said recording medium if a perpendicular direction to the recording medium is set as a vertical direction, and which records or reads information with respect to said recording medium;
an actuator structure which is disposed under said recording medium and which displaces said recording medium in a parallel direction to the recording surface; and a first heat buffer layer which is disposed between said recording medium and said actuator structure and which inhibits conduction of a heat from said actuator structure to said recording medium, wherein a thermal conductivity of said first heat buffer layer is less than a thermal conductivity of said recording medium.

2. The information memory apparatus according to claim 1, wherein the information memory apparatus comprises a second heat buffer layer which is disposed between said recording medium and said first heat buffer layer, and a thermal conductivity of said second heat buffer layer is greater than a thermal conductivity of said first heat buffer layer.

3. The information memory apparatus according to claim 1, wherein the information memory apparatus comprises a third heat buffer layer which is disposed between said actuator structure and said first heat buffer layer, and a thermal conductivity of said third heat buffer layer is greater than a thermal conductivity of said first heat buffer layer.

4. The information memory apparatus according to claim 1, wherein said actuator structure comprises a coil for generating a force, which is to displace said recording medium, by an electrically-driven method.

5. The information memory apparatus according to claim 1, wherein said actuator structure comprises a comb tooth electrode for generating a force, which is to displace said recording medium, by an electrostatically-driven method.

6. The information memory apparatus according to claim 1, comprising a heat release layer which is disposed under said actuator structure and which releases a heat emitted from said actuator structure.

7. The information memory apparatus according to claim 1, wherein said actuator structure, said first heat buffer layer and said recording medium are laminated in the vertical direction and are displaced in a unified manner in the parallel direction to the recording surface by a driving force created by said actuator structure.

* * * * *